(12) United States Patent
Esteve Rothenberg et al.

(10) Patent No.: US 8,559,434 B2
(45) Date of Patent: Oct. 15, 2013

(54) PACKET FORWARDING IN A NETWORK

(75) Inventors: Christian Esteve Rothenberg, Madrid (ES); Petri Jokela, Espoo (FI); Jimmy Kjällman, Espoo (FI); Pekka Nikander, Jorvas (FI); Teemu Rinta-Aho, Espoo (FI); Jukka Ylitalo, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 180 days.

(21) Appl. No.: 13/059,958

(22) PCT Filed: Oct. 10, 2008

(86) PCT No.: PCT/EP2008/063647
§ 371 (c)(1),
(2), (4) Date: Feb. 18, 2011

(87) PCT Pub. No.: WO2010/022799
PCT Pub. Date: Mar. 4, 2010

(65) Prior Publication Data
US 2011/0149973 A1    Jun. 23, 2011

Related U.S. Application Data

(63) Continuation-in-part of application No. PCT/EP2008/061167, filed on Aug. 26, 2008.

(51) Int. Cl.
*H04L 12/28* (2006.01)
(52) U.S. Cl.
USPC .......................................... 370/392; 709/238
(58) Field of Classification Search
USPC .................... 370/392, 409; 709/238
See application file for complete search history.

(56) References Cited

U.S. PATENT DOCUMENTS

| 6,341,311 | B1 | 1/2002 | Smith | |
|---|---|---|---|---|
| 7,826,369 | B2 * | 11/2010 | Filsfils et al. | 370/235 |
| 2002/0131418 | A1 | 9/2002 | Raftelis et al. | |
| 2004/0190517 | A1 * | 9/2004 | Gupta et al. | 370/392 |
| 2006/0268911 | A1 * | 11/2006 | Bergmann et al. | 370/409 |

FOREIGN PATENT DOCUMENTS

WO    WO 2006/020658    2/2006

OTHER PUBLICATIONS

Notification of Transmittal of the International Preliminary Report on Patentability corresponding to PCT/EP2008/063647, Date of Mailing: Nov. 17, 2008.
International Search Report corresponding to PCT Application No. PCT/EP2008/063647, Date of Mailing: Aug. 14, 2009.

(Continued)

*Primary Examiner* — Wei Zhao
(74) *Attorney, Agent, or Firm* — Myers Bigel Sibley & Sajovec PA

(57) ABSTRACT

A method of providing packet routing information comprises: encoding routing information from a source node to one or more destination nodes into a compact representation of set membership; and putting the compact representation of sets into a header of a packet that is to be sent from the source node to the destination node(s). The compact representation may be obtained by: generating d representations of a set of identifiers; generating d candidate compact representations of set membership from the d representations of the identifiers; and selecting one of the candidate compact representation of set membership. The selection may be made on the basis of which of the candidate compact representations has the lowest rate of returning false positives.

17 Claims, 12 Drawing Sheets

(56) References Cited

OTHER PUBLICATIONS

Written Opinion of the International Searching Authority corresponding to PCT/EP2008/063647, Date of Mailing: Aug. 14, 2009.
Bao "A New Approach to Anonymous Multicast Routing in Ad Hoc Networks" Second International Conference, IEEE, Piscataway, NJ, pp. 1-12, Aug. 22, 2007.
Castelluccia et al. "Hash-Based Dynamic Source Routing" *Networking*, LNCS 3042, pp. 1012-1023, 2004.
Sy et al. "ODAR: On-Demand Anonymous Routing in Ad Hoc Networks" 2006 IEEE International Conference, pp. 267-276, Oct. 1, 2006.
Aad et al. "Packet Coding for Strong Anonymity in Ad Hoc Networks" 2006 Securecomm and Workshops, pp. 1-10, Aug. 1, 2006.
Jimeno et al. "A Power Management Proxy with a New Best-of-N Bloom Filter Design to Reduce False Positive" Performance, Computing, and Communications Conference, IEEE, pp. 125-133, Apr. 1, 2007.
Kumar et al. "Segmented Hash: An Efficient Hash Table Implementation for High Performance Networking Subsystems" Symposium on Architecture for Networking and Communications Systems, Piscataway, NJ, pp. 91-103, Oct. 26, 2005.

* cited by examiner

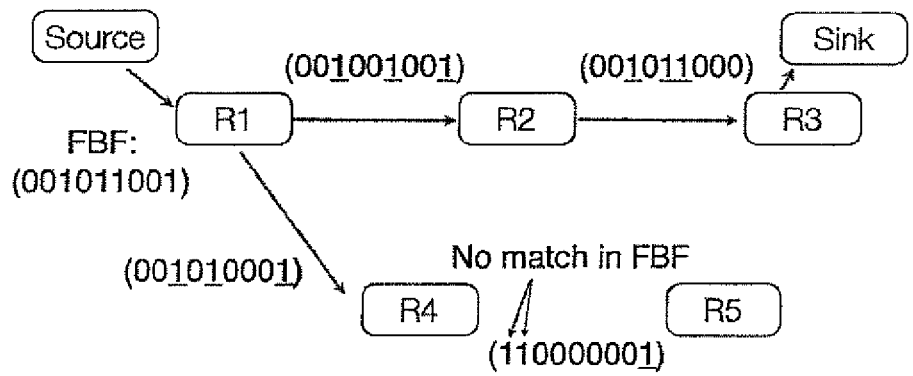
Figure 5 Forwarding with BF
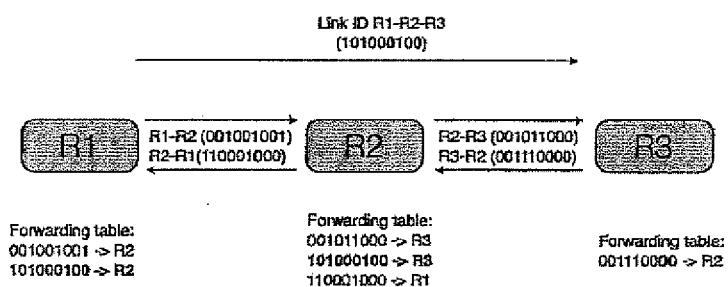
Figure 6

| Forwarding header | Publication ID | Data |
|---|---|---|
| BF: 001011001 | ViLS's ID | n-ID: 101000100; lifetime |

Figure 7  Virtual Link Setup packet

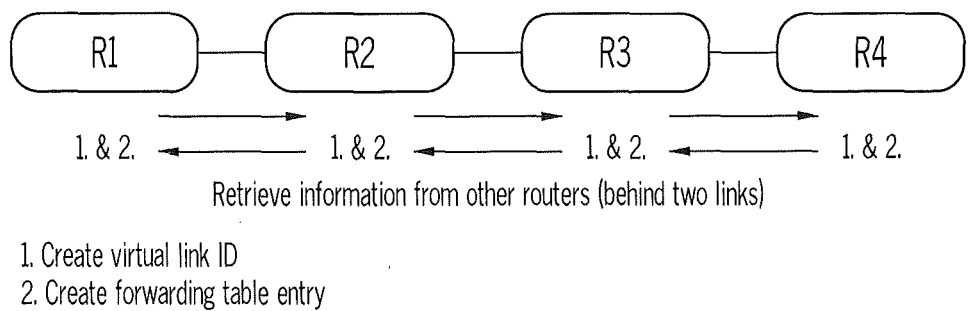

1. Create virtual link ID
2. Create forwarding table entry

Figure 11a) Enhanced self generation

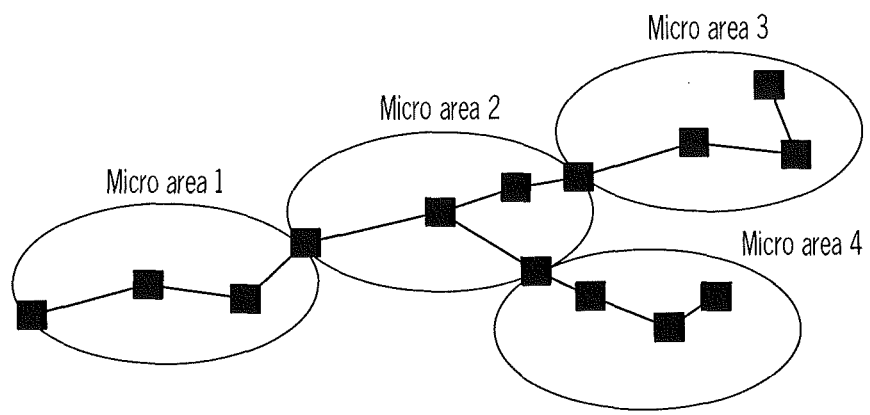

Figure 11b) Micro areas connected with stateful routers; illustrates the possibility to divide the network into areas inside which the paths are self generated. The routing function is responsible for generating full paths using the micro area information received from the corresponding micro areas.

| SINK | RENDEZVOUS FUNCTION | ROUTING FUNCTION | SOURCE |
|---|---|---|---|
| 1 Subscribe to P | | | |
| | 2 Locate source of P | | |
| | | 3 Determine path | |
| | | 4 Determine/ retrieve ID of each segment of path | |
| | | 5 Create Bloom Filter | |
| | | 6 Send BF to source | |
| | | | 7 Assemble BF into packet |
| | | | 8 Send packet |

Figure 12

| Receive packet at R1 | 1 |
| Check BF in packet header | 2 |
| Match links | 3 |
| Send packet | 4 |

Figure 13

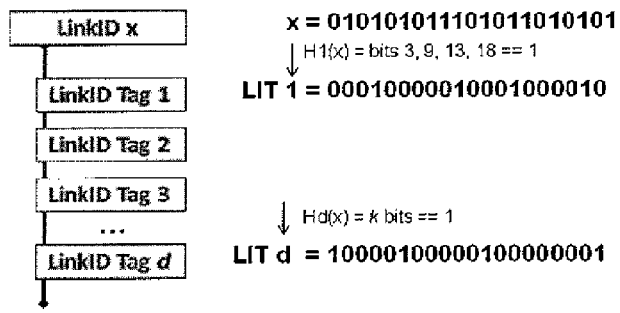
Figure 14. Relation of one link ID to $d$ Link ID Tags. Example of LIT generation by setting $k$ random to 1 and the rest remain zeros.
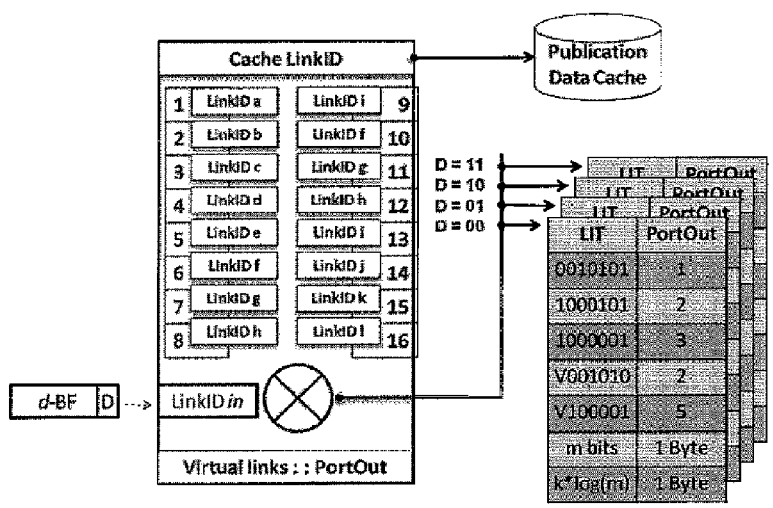
Figure 15. Schematic view of a forwarding element that identifies each output interface with a Link ID and maintains $d$ forwarding tables indexed by Link ID Tags.
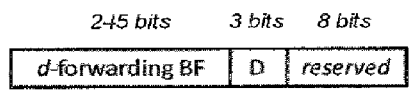
Figure 16. Example d-forwarding BF header.

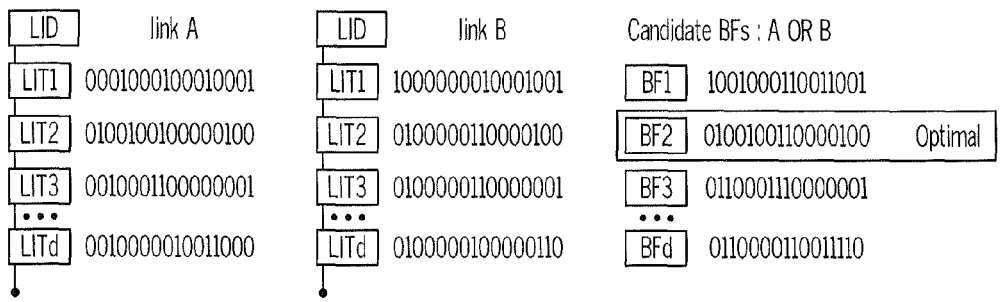
Figure 17  Generation of d candidate Bloom filters and selection of the optimal BF based on the maximum of zeros present in the bit vector.
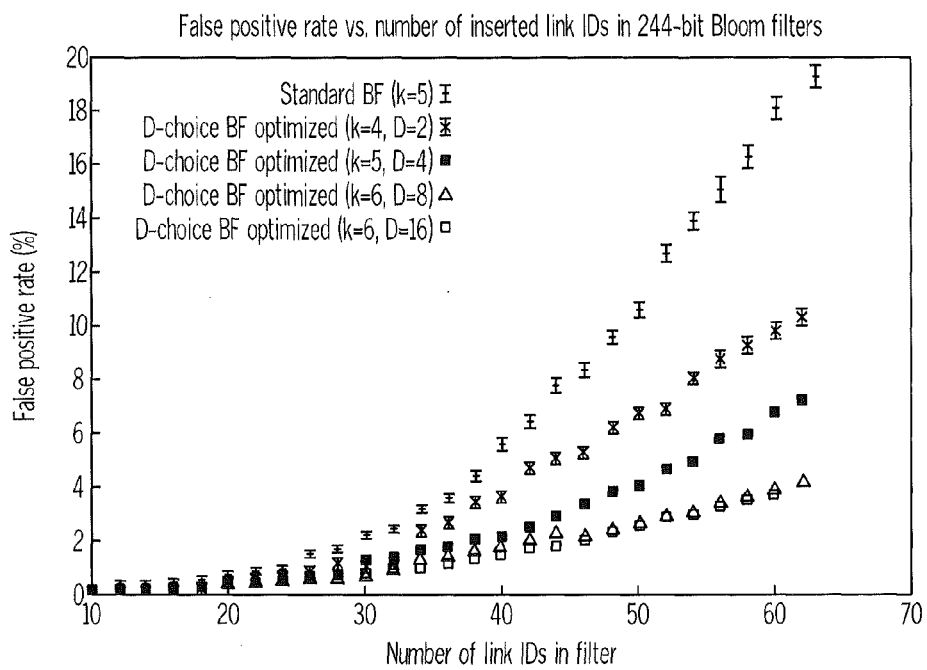
Figure 18  Actual false positive rate of standard BF constructs versus d-choice LIT optimized BF as a function of the number of link IDs inserted.

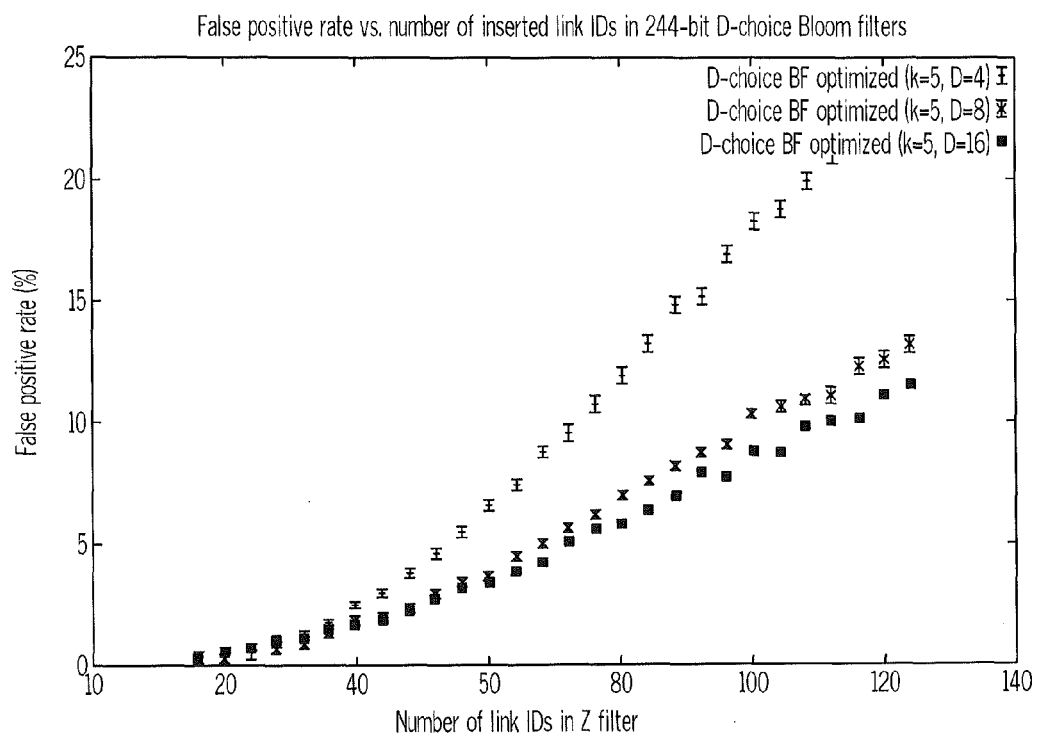
Figure 19 Actual false positive rate for different degrees of choices d for the Bloom filter construction as a function of the number of link IDs inserted. D = 8 appears to be a recommended parameter for 244-bit BFs.

| | |
|---|---|
| 1(1) | Determine LIT 1 |
| 1(2) | Determine LIT 2 |
| | ............... |
| 1(d) | Determine LIT d |
| | |
| 2(1) | Determine BF 1 |
| 2(2) | Determine BF 2 |
| | ............... |
| 2(d) | Determine BF d |
| | |
| 3 | Select one BF |

Figure 20

PACKET FORWARDING IN A NETWORK

CROSS REFERENCE TO RELATED APPLICATION

This application is a 35 U.S.C. §371 national stage application of PCT International Application No. PCT/EP2008/063647, filed 10 Oct. 2008, which claims the benefit of priority under 35 USC §120 as a continuation-in-part (CIP) of PCT International Application No. PCT/EP2008/061167, filed 26 Aug. 2008. PCT International Application No. PCT/EP2008/063647 was published in the English language as International Publication No. WO 2010/022799 A1 on 4 Mar. 2010, and PCT International Application No. PCT/EP2008/061167 was published in the English language as International Publication No. WO 2010/022767A1 on 4 Mar. 2010. The disclosures of both of the above referenced applications are hereby incorporated herein in their entireties by reference.

TECHNICAL FIELD

The present invention relates to packet forwarding in a network. In particular it relates to a method in which forwarding information is contained in a packet header so that a network node may determine along which link(s) the packet should be forwarded from the forwarding information in the packet header.

BACKGROUND

Publish-Subscribe ("pubsub") oriented networking, as described by Mikko Särelä, Teemu Rinta-Aho, and Sasu Tarkoma in "RTFM: Publish/Subscribe Internetworking Architecture", published in the proceedings of ICT Mobile Summit, Stockholm, Jun. 11-13, 2008, focuses on data, as opposed to the original Internet Protocol which focuses on hosts and end points, as primary named entities. This focus on naming end points, and universal connectivity between end points, creates a number of well known problems. Firstly, the current inter-networking paradigm allows parties to communicate with each other in an open network even though some parties are outright malicious, and others selfish. Secondly, a major fraction of contemporary applications are more in the business of information dissemination than that of end-to-end, two-way communication. Finally, from a hardware point of view, in many types of networks (e.g. certain types of radio, cable, and optical networks) broadcasting or multicasting is a more natural basic operation than sending a message to a single, explicitly identified recipient. ("Multicasting" is the delivery of information to a group of specified destinations simultaneously, whereas "broadcasting" refers to transmitting information such that it may in principle be received by any device on a network.) In view of these three problems, it is proposed that inter-networking based on the publish-subscribe paradigm would be more natural, efficient, and easy-to-implement than the current sender-oriented one.

In the cases of HTTP, peer-to-peer traffic, RSS-feeds, PSIP events, Service Oriented Architecture (SOA), etc, then, looking at the data more closely, it appears that a major fraction of this (and probably other) traffic consists of fairly simple information repetition. For example, even a dynamic web page typically consists of a large number of static components that are joined together with a small amount of client-specific HTML code. In many peer-to-peer networks, a major problem is to pre-distribute the data as close as possible to the prospective consumers in an optimal way.

Generalizing, it can be argued that, with the possible exception of real-time interactive traffic such as voice calls, the majority of contemporary network traffic is data oriented. That is, the applications are not interested in creating connections but are interested in transferring well defined pieces of data. Some of the data is transactional in nature, meaning that it is short lived and is specific to the communicating parties, but the vast majority of data seems to be sender and recipient agnostic. For example, if a user wants to get the newest CNN news, the bits are basically the same (more-or-less) independent of the user's identity, and the user does not care where the bits physically come from.

The huge variety of different technologies for delivering relatively simple, even static, data is causing many problems due to lack of interoperability. The competition for the future standard of data delivery has started. Given the incentives (produced by lack of interoperability and other deficiencies within current architecture) it is expected that within 10 years, there will be some standard way of publishing and retrieving data.

One idea behind the Publish-Subscribe paradigm is that one can avoid unwanted data delivery from one node to another. Using globally unique IP addresses, as in today's network, a sender can deliver a data packet to a host identified with an IP address without any explicit request from the receiver. This causes many problems, as it results in a user receiving unwanted, and even possibly malicious, data. This problem could be overcome by abandoning receiver-based addressing, such as used in the IP address scheme, as this removes the possibility of sending data to a destination host without the destination host having requested the data. However, if the IP address scheme were abandoned it would be necessary to provide a new mechanism that can be used to route packets through the network.

SUMMARY

A first aspect of the invention provides a method of providing packet routing information in which routing information, from a source node to one or more destination nodes, is encoded into a compact representation of set membership. The compact representations are put into a header of a packet that is to be sent from the source node to the destination node(s).

The compact representation of set membership may comprise a Bloom filter.

The routing information may comprise a plurality of link or node identifiers, each identifying a respective network link or respective network node. Alternatively, it may comprise an identifier that identifies a partial path, later referred to as a "virtual link", containing two or more network links. (As used herein, a "link" directly connects two nodes of a network and a "path" through the network comprises, in general, a plurality of "links".). Another routing information may comprise an identifier for network domains, that identify administrative domains or physical network areas.

The routing information may define one or more paths from the source node to the destination node(s), or it may define respective paths from the source node to two or more different destination node(s). When part of the paths are overlapping, such overlapping information is encoded only once, thereby representing a delivery tree instead of a set of paths.

The routing information may be encoded at a source node of the network. Alternatively the routing information may be encoded at a routing server with the encoded routing information being forwarded to the source node.

The method may comprise determining a path from the source node to the destination node(s) by interrogating the routing information contained in the header of the packet.

The method may comprise generating d candidate compact representations of set membership from d representations of the identifiers (d is an integer greater than 1).

One of the compact representations of set membership may then be selected for use. The selection may be made according to a user-determined criterion such as, for example which representation has the lowest rate of generating false positives, which representation has the lowest rate of generating false positives for a sub-set of one or more of the identifiers, or which representation will not generate false positives for a sub-set of one or more of the identifiers.

The selected compact representation of set membership may for example be included in a packet header to provide routing information.

A second aspect of the invention provides a method of routing a packet through a network. A packet is received at a network node; and routing information contained in the header of the packet is interrogated to determine one or more links along which the packet is to be sent from the node and/or to determine one or more other nodes to which the packet is to be sent from the node. The routing information is contained in the header of the packet as a compact representation of set membership. The packet is forwarded along the determined link(s) and/or to the determined other node(s) from the network node.

The compact representation of set membership may comprise a Bloom filter.

The routing information may comprise a plurality of link identifiers, each identifying a respective network link or node. Alternatively, it may comprise an identifier or identifiers that each identify a partial path containing two or more network links.

The routing information may comprise one of a plurality of candidate representations of the one or more identifiers.

The routing may comprise selecting, from a plurality of look-up tables, a look-up table corresponding to the received representation of the one or more identifiers.

A third aspect of the invention provides a network node comprising means for receiving a packet. It further has means for interrogating routing information contained in the header of the packet as a compact representation of set membership to determine one or more links along which the packet is to be sent from the node and/or one or more other nodes to which the packet is to be sent from the node. The node forwards the packet along the determined link(s) and/or to the determined other node(s).

The routing information may comprise a plurality of link or node identifiers, each identifying a respective network link or node. Alternatively, it may comprise an identifier or identifiers that each identify a full or partial path containing two or more network links.

The network node may be adapted to select, from d look-up tables each corresponding to one of d candidate representations of the one or more identifiers, a look-up table corresponding to the received representation of the one or more identifiers.

The compact representation of set membership may be a Bloom filter.

The method of the first aspect may comprise defining a path through a network, which path comprises a plurality of segments, each segment having an associated identifier. An identifier, different from the identifiers associated with each segment included in the path, is assigned to the path. Encoding the routing information comprises encoding the identifier assigned to the path, rather than encoding the identifiers associated with each segment of the path.

The identifier assigned to the path may be unrelated to the identifiers associated with each segment included in the path.

At least one segment of the path may comprise two or more links each of which directly connects two network nodes.

A fourth aspect of the present invention provides a network node for providing packet routing information, the node being adapted to encode routing information from a source node to one or more destination nodes into a compact representation of set membership for inclusion into a header of a packet that is to be sent from the source node to the destination node(s).

The network node may be adapted to send the compact representation of set membership to the source node, for example if the network node is a routing function node.

Alternatively, the network node may be the source node, in which case the network node may be adapted to include the compact representation of set membership into a header of a packet that is to be sent from the source node.

The compact representation of set membership may be a Bloom filter.

The network node may be adapted to encode routing information comprising representations of one or more identifiers by generating d representations of at least some of the identifiers; generating d candidate compact representations of set membership from the d representations of the identifiers; and selecting one of the candidate compact representations of set membership.

Alternatively the network node may be adapted to encode routing information comprising representations of one or more identifiers by generating d representations of at least some of the identifiers; generating d candidate compact representations of set membership from the d representations of the identifiers; and sending two or more of the candidate compact representations of set membership to another node. The other node may for example be the source node, which is then able to select one of the received candidate compact representations and include the selected compact representation in a packet header. Alternatively the other node may select one of the received candidate compact representations but, rather than itself making use of the selected compact representation, may forward the selected compact representation to another node.

Each identifier may identify a respective network link, a respective node, or a full or partial path containing two or more network links.

A fifth aspect of the present invention provides a method of generating, a compact representation of a set of identifiers. The method comprises initially generating d representations of the identifiers, and d candidate compact representations of set membership are generated from the d representations of the identifiers. One of the candidate compact representations of set membership is then selected for use.

The selection may be made on the basis of a criterion pre-defined by a user.

The method may be implemented by a suitable processor, for example in a processor contained in or constituting a network node.

The representations of the identifiers may be compact representations. By a "compact" representation of an identifier is meant a representation that has fewer bits set to one, preferably substantially fewer bits, than the identifier that it represents. Use of a compact representation has the advantage that few, if any, limits are placed on the length and format of the identifier itself.

The compact representation of set membership may be a Bloom filter.

Other aspects of the invention provide a computer-readable article containing instructions which, when executed on a processor cause the processor to perform a method of the first aspect of the invention or to perform a method of the second aspect of the invention.

The invention also provides a network node for encoding packet routing information comprising representations of one or more identifiers by: generating d representations of at least some of the identifiers and generating d candidate compact representations of set membership from the d representations of the identifiers.

The invention also provides a network node for providing packet routing information comprising representations of one or more identifiers, the node being adapted to receive a plurality of candidate compact representations of set membership and to select one of the compact representations of set membership according to a pre-determined criterion. The criterion, which may be user-defined, may for example which representation has the lowest rate of generating false positives, which representation has the lowest rate of generating false positives for a sub-set of one or more of the identifiers, or which representation will not generate false positives for a sub-set of one or more of the identifiers.

The invention also provides a source node adapted to receive a compact representation of set membership, and to include the compact representation of set membership in a packet header to provide routing information.

The compact representation of set membership may be a Bloom filter.

BRIEF DESCRIPTION OF THE DRAWINGS

Embodiments of the invention will be further described, by way of example, with reference to the accompanying drawings, in which:

FIG. 5 illustrates forwarding a packet through a network according to an embodiment of the invention;

FIG. 6 illustrates creating a virtual link through a network according to another embodiment of the invention;

FIG. 7 is a schematic diagram of a Virtual Link Setup packet;

FIGS. 11(a) and 11(b) illustrate self-generation of paths;

FIG. 12 is a block flow diagram illustrating provision of forwarding information in a packet header;

FIG. 13 is a block flow diagram illustrating forwarding a packet through a network according to the embodiment of FIG. 5;

FIG. 14 illustrates generation of tags corresponding to an identifier;

FIG. 15 schematically illustrates a forwarding node according too another aspect of the invention;

FIG. 16 is a schematic illustration of a packet header;

FIG. 17 illustrates a method according to another embodiment of the invention;

FIG. 18 illustrates the reduction in false positive rate obtainable by an embodiment of the invention;

FIG. 19 illustrates the false positive rate; and

FIG. 20 is a block flow diagram of a method of another aspect of the invention.

DETAILED DESCRIPTION

Figure 1:
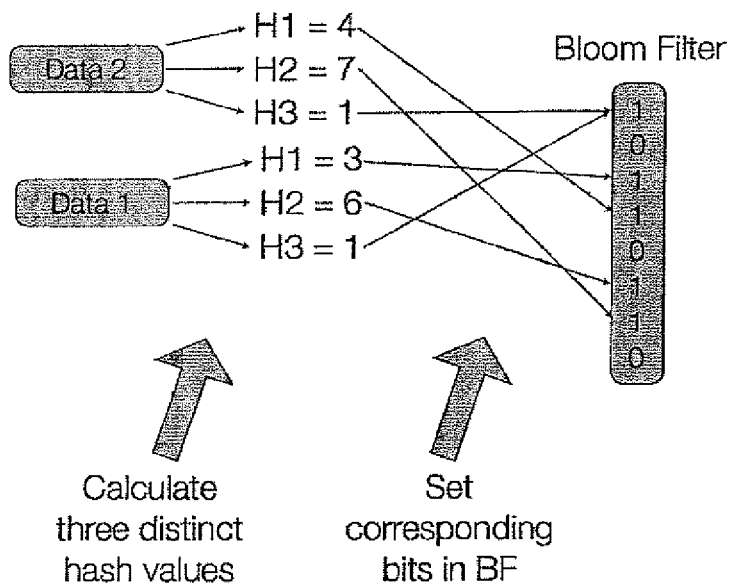
FIG. 1 is a schematic diagram illustrating the process of adding items to a Bloom Filter.

The present invention will be described with reference to embodiments in which the routing information is contained in a Bloom Filter. However, the invention is not limited to a Bloom Filter, and other compact representations comprising encoding routing information into a set membership that can be interrogated to identify a routing information similar to using a Bloom Filter in functionality may be used such as, for example, the representation described by A Pagh et al. in "An Optimal Bloom Filter Replacement", Proceedings of the sixteenth annual ACM-SIAM symposium on Discrete algorithms, pages 823-829 (2005). The invention may also be effected with modified Bloom filters such as disclosed by, for example, M. Mitzenmacher in "Compressed Bloom Filters", IEEE/ACM Transactions on Networking, Vol. 10, No. 5, p604 (2002).

The present invention provides a new Bloom Filter (BF)-based source routing scheme where routing information is included in a BF in the packet header. Usually, the term "source routing" is used when the source node controls the full path that the packet will take from the source node to the destination node. Other used terms are "strict source routing" when the exact path is known and "loose source routing" when the source node defines only some points in the network through which the packet will travel.

The proposed solution is "source routing" in the sense that the routing functionality knows the whole path of the packet up to a destination or a set of destinations and creates a packet header based on this information. Also, this can be considered to be strict source routing, because each node on the path is known. (It should be noted that, as explained below, a node acts as a forwarding element in the present invention and does not itself make decisions about which route a packet should take.) The created packet header is given to or constructed at the source node for incorporation in the packet. When using a BF-based header where all distinct forwarding steps are included, the forwarding node cannot extract any single node or link information from the header. Thus the nodes are not actually aware of where the packet will be routed. Each node on the path can only use their own link information to verify where the packet should be passed.

Using the Bloom filter based method of the invention it is also possible minimize the state information that is needed in the network nodes.

Before describing embodiments of the invention, a preliminary description of Bloom Filters will be given.

Bloom Filters

Bloom Filters (BF) provide an efficient way of including data items in a compact representation of set membership. Few distinct hash values are calculated over a data and these hash values represent certain bits in the Bloom Filter bit string, which during item addition are set to one.

Using the same methodology, it is possible to insert link information in the set representation, where link information corresponds to a link between two nodes in the network. From the Bloom Filter where data items have been added, it is impossible to extract the added information. It is only possible to verify if the item is included there or not. There is a small possibility for false positives (informing that the data item has been added, while in fact it has not been added), but no possibility for false negatives. When applying this to routing, a BF that is used for packet forwarding can create additional packet multiplications in the network due to false positives, which in pub/sub networks is considered to be not harmful as long as there is a way to control the false positive rate. In case of BFs it means that it is possible to control the number of items to be added, and the size of the filter. But, which is more important, the data is always routed at least via links which have been added to the set representation.

As a result, the BF (e.g. 128 bits long) can be added to a packet header, and it contains the whole route from the source node to the destination node. This may be end-to-end, or only a part of the path between the original data publisher and the subscriber. In a network node, only a minimal amount of forwarding information needs to be maintained. E.g. each node typically maintains a routing table, each table entry holding information needed to identify those packets that will be sent over a given link. In that case, it is possible that the node needs only one entry in the forwarding table for each node that it connects to.

The forwarding process is efficient, while the packet identifying information in the forwarding table entry is bitwise ANDed (where "ANDed" denotes the logical AND operation) with the BF in the packet header, and if the result is equal to the packet identifying information, the packet is forwarded to the corresponding outgoing link. If the result is not equal, the identifier for the particular link was never added to the Bloom Filter and the packet is not forwarded to that link.

The invention can thus provide compact source routing information in a packet header based on Bloom Filters. This minimises the state information that must be held in network nodes.

It is further noted that there are alternative ways of naming the links between nodes. The identifiers may have free format, in which case their Bloom filter representation is computed in the usual manner of taking k different hashes over the identifier. Alternatively, the link names may be constructed directly of k "1" bits and m-k "0" bits, or k-z . . . , k−1, k, k+1 . . . k+z "1" bits and corresponding number of "0" bits, where z is very small, in which case such hashing is not needed in order to construct the Bloom filter. In both cases, the naming scheme must encode enough of entropy (randomness) to the names in order to avoid hash collisions. To make a distinction between a free-form link identifier and a Bloom-filter compatible k-of-m bits identifier, the latter are called link IDs in this invention.

A Bloom Filter (BF) is a simple way to add data elements in a compact representation of a set, called a filter, and later test if the element has been earlier added to it. A BF is a bit string, containing a pre-defined number of bits, e.g. 128 bits, that are initially all set to zeros. The size of the BF may vary depending on the use. As an example, in FIG. 1 the number of bits in the BF is eight. In a general case, an 8-bit BF would be a very small BF and would, in practice, be unusable for any purpose. Adding a data item to a BF is a process where a number of distinct hash values are calculated from an identifier. In case of the example in FIG. 1, three distinct hash values are calculated by applying three different hashing algorithms to the identifier "data 1", such that each of these values is between 1 and 8. Each of these values represent one bit in the BF. After the hash values are calculated, each corresponding bit in the BF is set to one. In the example of FIG. 1 the three hash values are 3, 6 and 1, and the $1^{st}$, $3^{rd}$ and $6^{th}$ bits in the Bloom filter are set to "1". This comprises the link ID for the identifier "data 1".

FIG. 1 shows also adding another identifier—"data 2"—to the BF. The distinct hash values are calculated similarly, and if the corresponding bit is already set to one in the BF, the bit remains as one. In the example of FIG. 1 the three hash values obtained from "data 2" are 4, 7 and 1, and the $4^{th}$ and $7^{th}$ in the Bloom filter are set to "1" (the $1^{st}$ bit has already been set to "1", when "data 1" was added to the Bloom filter. It is clear that when items are added in this way, there is no possibility to remove any items from the BF; one cannot know if a bit with value "1" comes from one or more data items. (There exists variants of BF where solutions to these limitations have been proposed, and e.g. a counter has been attached to each of the bits. The counter is increased each time an item is added and the corresponding bit is set to one. Removing an item would cause the counter value to be decreased and once the value is zero, also the corresponding bit can be set to zero. This solution, however, may lead to a problem when there is a counter value overflow of one bit; decreasing the value is not reliable any longer. Another downside of including a counter value is that the size of the BF increases and it is no longer a compact representation of included data items. The present invention requires a compact BF and, in the basic form of the invention, we do not need to remove items from the BF. The BF is discarded once used.)

Figure 2:
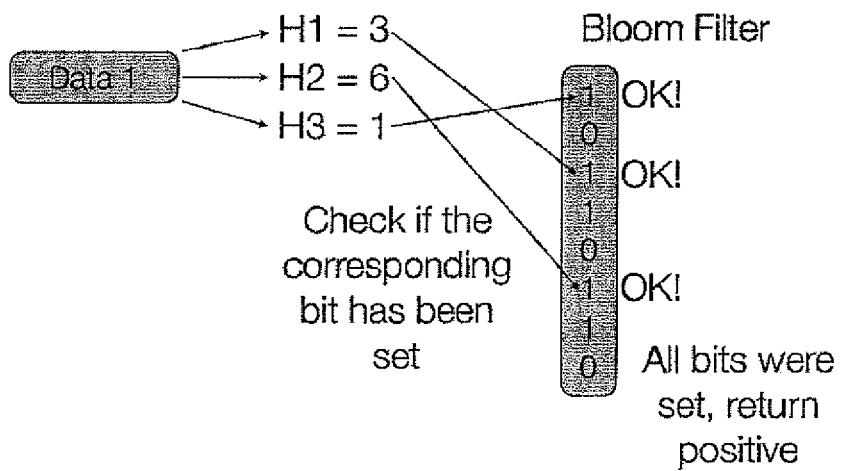
FIG. 2 is a schematic diagram illustrating the process of verifying whether a data item has been added to a Bloom Filter.

When we want to verify if a specific data item has been added to a BF, we start the process by calculating the required number of distinct hash values over the data resulting in a set of numbers corresponding to certain bits in the BF bit string. During the verification process, we check the value of these bits in the BF; if all the values have been set to one in the BF, the verification process returns true and if any of the bits is zero, the verification returns false. This is illustrated in FIG. 2, which shows the process of checking whether "data 1" is a member of the Bloom filter created in FIG. 1. The three hash values are created for "data 1", using the same three hash algorithms as used to create the Bloom filter, and these are 3, 6 and 1. When the Bloom filter is checked, it is found that the $3^{rd}$, $6^{th}$ and $1^{st}$ bits of the Bloom filter are all set to "1", and this indicates (correctly) that "data 1" is included in the Bloom filter.

One feature of a Bloom filter is that process of verifying whether an item is a member of a Bloom filter is not wholly accurate and can give rise to a "false positive". However, it cannot give rise to a "false negative". If the data item has indeed been included, the filter verification returns always "true" as the corresponding bits of the Bloom filter will all be "1" (as the calculation process is the same during adding an item to the Bloom filter and during verification). Thus, we get a correct answer. However, if any of the bits checked in the verification process is found to be zero, the verification returns "false" and we know that the item has not been added to the Bloom filter.

Figure 3:
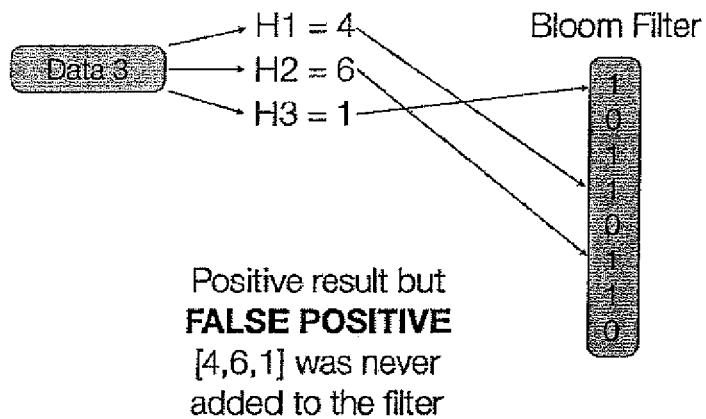
FIG. 3 is a schematic diagram illustrating a Bloom Filter verification returning a false positive.

However, as shown in FIG. 3, it is possible that the filter verification returns true even if the data item has not been added to the filter. In the example of FIG. 3 the three hash values obtained from "data 3" are 4, 6 and 1, and the $4^{th}$ $6^{th}$ and $1^{st}$ bits of the Bloom filter are all found to be "1" so the verification process returns that "data 3" is included in the Bloom filter. This result is however incorrect, since "data 3" was not added to the Bloom filter when it was created in FIG. 1, and in this case we say that the verification returns a "false positive".

The rate of false positives depends on the length of the filter and the number of items added to the filter.

Using Bloom Filters for Routing

According to the present invention each link of a network, i.e. connection between two nodes, is considered as a identifiable data item having an identifier (or "name"). Thus, the invention proposes that, when a packet is requested, a path is chosen through a network from a source node to a destination node, which may be described as a sequence of link identifiers. The sequence of link identifiers is encoded into a BF, and the BF is put in the packet header.

Alternatively, instead of identifying the links that make up a path through a network one could define the path by identifying the nodes along the path. However, in the case that there may be two or more different links between two nodes of the path, such a scheme would contain less information and lead to less optimal operation, e.g., in the case where there is a need to balance traffic load between parallel links. Hence, without loss of generality, the preferred embodiments present invention are described only in terms of identifying a path by the links that make up the path, but it should be understood that the invention is not limited to this. It should be noted, though, that in the case of a pure radio network, such as a Mobile Ad Hoc Network (MANET), there are no identifiable links and therefore in such an environment the present invention would use node identifiers instead of link identifiers. Furthermore, it must be noted that when node IDs are used instead of (unidirectional) link IDs, there must be a mechanism to avoid excessive looping, e.g., each packet may carry a lifetime indicator and the identity of a few recently visited nodes, or each node may remember a sufficient number of recently seen packets.

A node in the network can determine which outgoing link(s) from the node it should forward the packet along, by interrogating the Bloom filter in the packet header to determine which outgoing link IDs have been added to the Bloom filter in the packet header—if a particular outgoing link identifier has been added to the Bloom filter in the packet header, the packet is forwarded along that link. This process is repeated at each node along the path. (If the path is defined in terms of nodes along the path rather than in terms of the links that make up the path, the node would interrogate the Bloom filter in the packet header to determine to which other network nodes it should send the packet, and the packet is forwarded to the node(s) obtained by interrogating the Bloom filter.)

The invention makes use of the advantage of the BF in the sense that it is a compact representation of the data items and that it always returns a correct answer if the data item has been added to the filter. In case of "pub/sub" routing false positives are not a concern, as long as the probability is low. False positives cause the packet to be delivered to a wrong destination—which is not considered to be harmful, as long as the rate of false positives can be controlled. In BFs the rate of false positives depends on the length of the BF, the number of bits representing a data item and the number of data items that have been added to the filter.

An embodiment of the invention will be described with reference to FIGS. 4 and 11. This embodiment relates to generation of the Bloom filter.

Figure 4:
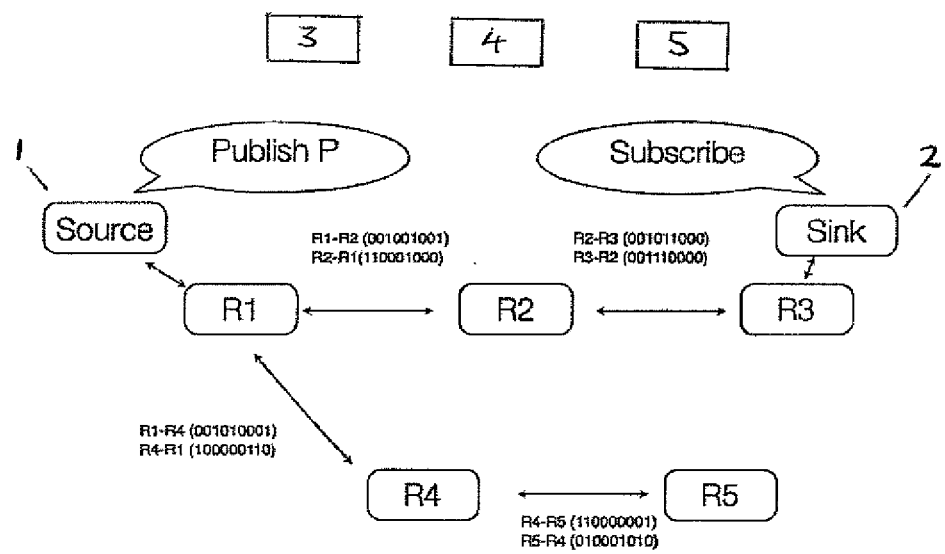
FIG. 4 illustrates forwarding a packet through a network according to an embodiment of the invention.

FIG. 4 is a schematic view of a simple network having nodes R1 to R5. A packet source 1 is connected to node R1 and a packet destination (or "sink") 2 is connected to node R3. Each link between two of the nodes R1 to R5 is provided with a link identifier; in the embodiment of FIG. 4 direct Bloom-filter compatible link IDs are used and they are generated as a directed identifiers so that each link has two separate link IDs, one for each direction. This is needed to avoid loops in some situations (described below). As an example, the link from node R1 to node R2 has link ID 001001001, and the reverse link from node R2 to node R1 has link ID 110001000. The link IDs in the example are chosen to be very short, 9 bits, for illustration but will in practice be longer than this.

The embodiment of FIG. 4 relates to a Pub/Sub network in which the functionality required for locating and delivering data between source and destination nodes can be considered to consist of three different operations; Rendezvous, Routing, and Forwarding. Roughly, the Rendezvous mechanism is responsible for maintaining publication location information in the network, the Routing mechanism is responsible for creating and configuring routes from the data location to the subscribing node based on the information that is maintained in the rendezvous system, and the Forwarding function is responsible for forwarding the actual data packets through the network. These are denoted schematically in FIG. 4 as items 3, 4 and 5 respectively.

It is assumed that the source 1 publishes publication P. This information is stored in the Rendezvous system 3 so that the publication P maps to its current location. When the user at the sink 2 subscribes to publication P (step 1 of FIG. 11), the location information for the publication P can be found from the Rendezvous system 3 (step 2 of FIG. 11). This provides information about the current location of the data and the destination where it needs to be delivered.

The Routing function 4 needs the source and destination node information for building a forwarding path between the source 1 and the destination (the sink 2). The Routing function 4 maintains information about network links, the associated link Ids, and the nodes which the link connects—for example, the information maintained in the Routing function can be the node pairs and, for each node pair, the link ID of the link between them. Once the information about link IDs, and the nodes that the links connect, is in the Routing layer, it can build a path through the network using the source and destination node information.

Thus, the Routing function has knowledge about the network topology. When the

Routing function gets a request to build a path between nodes A and B, it can create the path using the links from e.g. A to C and C to B, if A and C as well as B and C are directly connected. Thus, when the Routing function 4 is notified that the sink 2 has requested the publication P from source 1, it can create, based on the source and destination node information, a path from the source 1 to the destination 2 (step 3 of FIG. 11). In the example of FIG. 4 the routing system uses the network topology information and determines that the data needs to travel the path R1-R2-R3.

The determined path may be expressed as a sequence of link identifiers, in this case as {001001001, 001011000} to denote a path formed of the link R1 to R2 and the link R2 to R3. To do this, the Routing function determines or retrieves (step 4 of FIG. 11) the link ID of each link in the path that it has defined at step 3 of FIG. 11.

There are various ways to determine the link IDs. They can be automatically generated by the nodes (for example a node can assign a link ID for its own outgoing links towards nodes that it know it is connected directly to) and communicated afterwards to the routing function, or they can be assigned by other instances and configured on the nodes. A link ID may for example be obtained by applying a required number of hashing algorithms to an underlying identifier and obtaining a bit mask from the resultant hash values. However, for the purposes of the invention it is not necessary that the link ID is anything else than a bit mask that that can be directly applied to BF addition and verification—a suitable bit mask may be obtained by setting k bits of a string of bits of length m bits to be "1" with the remaining bits remaining as "0" (where the Bloom filter has a length of m bits and k<m).

In practice it is advantageous for all link IDs to have the same bit mask length m, since it would be inefficient to process variable length fields in hardware. Hence, in practice it is advantageous to determine the maximum affordable size for m, and then use that as the bit mask length for all link IDs. However, the number k of bits set to "1" in the bit mask forming a link ID may vary in the network, and the number k of bits set to "1" does not have to be the same for all links. For example, the link ID for a high capacity link may be formed by setting $k_0-1$ bits of a string of bits of length m bits to be "1" whereas a normal capacity link has a link ID formed by setting $k_0$ bits of a string of bits of length m bits to be "1". This may increase the number of false positives on the high capacity link, but should reduce the number of false positives on other links. Conversely the link ID for a low capacity link may be formed by setting $k_0+1$ bits, or even $k_0+2$ bits, of a string of bits of length m bits to be "1". This should reduce the number of false positives on that link, but may increase the number of false positives on other links.

The k bits that are set to "1" to form a link ID may be selected at random. However, the k bits may be selected in other ways—for example, locally it might make sense to select the k bits for each outgoing link from node so that there is no overlap between the link IDs of the links from a node. Consequently, the probability of sending a packet over more than one link from a node when it should be send over just one outgoing link will drop drastically (although more false positives may occur elsewhere).

The length m of the Bloom filter is preferably chosen such that the Bloom filter is, after all routing information has been written into the Bloom filter as described below, no more than half full, i.e., no more than m/2 bits are set to "1", as the ratio of false positives can become significant if the Bloom filter is more than half full. However, putting the Bloom filter into the packet header is only practicable if the number of bits of the Bloom filter is reasonably low. In many practical cases, a Bloom filter of length of around 128 bits should provide a suitably low number of false positives.

Once the path has been determined, the Routing function 4 creates (step 5 of FIG. 11) a BF containing the link IDs of the path. When the link IDs are constructed as describe above and contain "m" bits of which k (or k−1, k+1, etc) ones are "1" bits, each link ID is ORed into the BF (where ORed denotes the logical OR operation), so that the BF contains information about each of the links on the path. In the example of FIG. 4 the path contains two links, from R1 to R2 (link ID: 001001001) and from R2 to R3 (link ID: 001011000), and the generated Bloom filter is therefore 001011001.

The routing function sends (step 6 of FIG. 11) the created source routing BF to the data source 1 together with the publication P identifier. The source node creates a packet from the publication P and puts the received BF into the header (step 7 of FIG. 11). The packet is now ready for delivery, and may be sent by the data source 1 (step 8 of FIG. 11).

In principle, the routing information may be encoded in the Bloom filter at the source node rather than at the routing function 4 as described above.

Delivery of the packet is illustrated in FIGS. 5 and 12. The packet, which contains routing information as a Bloom filter in its header (in the example of FIG. 5 the Bloom filter in the packet is the Bloom filter 001011001 generated in FIG. 4) is first sent to R1. When the packet is received at node R1 (step 1 of FIG. 12), R1 interrogates the routing information in the packet header by checking the Bloom filter included in the packet header (step 2 of FIG. 12), and tries to match (step 3 of FIG. 12) the link ID values of the outgoing links from R1 to the BF in the packet header. For example, each forwarding table entry in R1 may consist of the link ID of an outgoing link and the index of the corresponding physical link. The matching process is as illustrated in FIG. 2.

The packet is forwarded (step 4 of FIG. 12) along the link or links outgoing from node R1 that have link IDs that match the Bloom filter. In this example node R1 has two outgoing links, to node R2 (link ID: 001001001) and to node R4 (link ID: 001010001). The result at R1 of matching the Bloom filter 001011001 in the header of the received packet to the outgoing links is two positives; one correct positive and one false positive. The link R1-R2 has indeed been added to the BF in the received packet resulting in a correct positive response from the verification. However, the link R1-R4 was never added to the BF, and the matching of the link to node R4 with BF in the received packet is a false positive.

The packet is therefore (correctly) forwarded to node R2 and is also (incorrectly) forwarded to node R4. The process of interrogating the Bloom filter in the packet header and looking for outgoing links that are included in the Bloom filter is repeated at each node at which the packet is received. Thus in the example of FIG. 5, when the packet is received at nodes R2 and R4 the above process is repeated at each node. At node R4, there is no outgoing matching link ID, and the packet is dropped. (Unlike IP, where a packet can be delivered using the same destination IP address from anywhere in the network towards the destination, the BF based header of the invention can be used for routing only on a specific path. Once the packet is outside the path, it doesn't have any matching link IDs included and the packet cannot be delivered correctly.) At node R2 however, the BF in the packet header further matches the link towards R3 (step 4) and the packet is forwarded to node R3 using that link.

The final delivery from node R3 to Sink 2 may be handled in any convenient way, and the invention is not limited to any particular method of final delivery. For example, the link ID towards the Sink 2 could be added to the BF when the BF is created, and the packet may be forwarded from node R3 to the sink in a similar way as it is forwarded between the nodes R1, R2 and R3. As another example R3 could maintain the subscription information from the sink, matches the publication ID on the subscription and forwards the data to the sink.

Virtual Links

One problem with Bloom Filters is that they can get "full" relatively quickly. The probability of a false positives increases when more elements are added to one filter, and it is generally undesirable for a Bloom filter to be significantly more than half full. Furthermore, as noted above, it is desirable to keep the length of the Bloom filter relatively short. In a preferred feature of the invention, therefore, a "Virtual link" is defined from multiple single links (where a single "link" directly links two network nodes), allowing a more efficient way of describing delivery trees in the network and requiring fewer link IDs to be added to BFs. When a "virtual link" is used in routing a packet according to the method of the invention, routing using a virtual link is effected in the same way as described above. The link ID of the virtual link is encoded, for example in a Bloom filter, and is put into the packet header. The forwarding tables of the nodes along the virtual link are configured to include the link ID of the virtual link and the appropriate forwarding destination(s). When a node receives a packet having the link ID of the virtual link in its header, it forwards the packet to the destination(s) associated in its forwarding table with the link ID of the virtual link.

Consider the case shown in FIG. 6, when the routing function is delivering data from R1 to R3. For some reason, this partial path is heavily loaded and multiple different transmissions use the same path. It may therefore pay to define a "Virtual link" between R1 and R3. In FIG. 6 the routing function has defined such a virtual link from R1 to R3 via R2, and has given it a virtual link ID. In the example of FIG. 6 the virtual link is defined from two single links R1-R2 and R2-R3, but a virtual link may include more that two single links. The new virtual link is thus R1-R2-R3. To secure of a delivery of a packet from node R1 to node R3 it is therefore necessary to enter only the link ID of the virtual link into the Bloom filter in the packet header, rather than entering the link IDs of the link R1-R2 and the link R2-R3.

A generated virtual link has a link ID, which need not be directly related to the link IDs of the underlying links used to create the virtual link. In the example of FIG. 6, the virtual link R1-R2-R3 is given the link ID 101000100.

The link ID of the virtual link may be an m bits long bitmask of which k bits are "1" and k-m bits are "0", as described for the link IDs, or it may be obtained by applying a hash function to an underlying identifier for the link. Where the link ID is a bitmask, it would be possible to use a specified bit of the bitmask to denote whether a link was an actual link or a virtual link, by setting a specified bit to "1" if the link is an actual link and to "0" if the link is a virtual link (or vice versa).

Nodes that belong to a virtual link, i.e. that lie on the physical path corresponding to the virtual link, need to know about the virtual link so that they can forward packets. For example, for each virtual link, there may be a new forwarding table entry in the nodes of the link (except the last node of the link). Thus, in FIG. 6, the forwarding table for node R1 further contains an entry for the virtual link R1-R2-R3, which indicates that a packet that contains the link ID 101000100 in its packet header is to be forwarded to node R2. Similarly, the forwarding table for node R2 further contains an entry for the virtual link, which indicates that a packet that contains the link ID 101000100 in its packet header is to be forwarded to node R3.

When a new virtual link is set up it has to be communicated to the nodes that belong to the newly created virtual link. One way to communicate information about the virtual link is to deliver the new virtual link ID to each of the nodes of the link separately but it may alternatively be possible to use a more elegant way and allow the nodes to get this information from a separate control packet delivered through the relevant nodes.

For example, to deliver information about a new virtual link using a control packet, the routing function may use a Virtual Link Setup Packet (ViLS), see FIG. 7, to inform nodes about the new virtual link ID. The BF in the ViLS packet header contains a normally calculated BF, to which both R1-R2 and R2-R3 link IDs have been added as described above so that the packet is forwarded along the link R1-R2-R3. In the data field of the ViLS packet the new virtual link ID is included, as well as the lifetime of the virtual link if this is needed. Each node that receives the ViLS packet can read the link ID from the ViLS packet, and add the link ID to its forwarding table with the corresponding outgoing link. The publication ID field or some other field in the packet header may be used to indicate the ViLS packet type, but there are also other methods for this. There is no need to include other information in the data field of the ViLS packet related to setting up forwarding table entries in nodes—the BF in the packet header may be used for this purpose, thus the outgoing links defined in the node's forwarding table are the same as where the BF in the packet would route the packet from the node and where the ViLS packet is next sent to.

When relying on the normally calculated BFs for distributing information about virtual links, as described above, the representation of the virtual link in the network will contain the same false positives as the normally calculated BF does, if any. When it is desirable to avoid such false positives, a ViLS packet may explicitly encode the link IDs of the links forming the virtual link, for example, in the data part of the packet. When the link IDs are explicitly encoded into a ViLS packet, each node along the virtual link will set up the forwarding table for the virtual link by comparing the outgoing link IDs with the explicitly encoded link IDs in the packet, disregarding the BF in the packet header for this purpose.

To add a virtual link to the forwarding tables of the network nodes, the Routing function injects the newly built ViLS to node R1. The node R1 notices that this is a control packet, obtains the required information for the new forwarding table entry describing the new virtual link from the packet data field and puts the new entry into its forwarding table. The destinations for this entry may be determined by the BF in the ViLS packet header or by explicitly listing them, as described above. Typically, the same destinations are added to the forwarding table as where the ViLS packet will be further delivered by the normal packet forwarding mechanism. Thus, in this example node R1 adds the link ID of the virtual link R1-R2-R3 to its forwarding table, against the outgoing link to node R2. The ViLS packet is then forwarded to node R2, where the process is repeated—so that node R" adds the link ID of the virtual link R1-R2-R3 to its forwarding table, against the outgoing link to node R3. The ViLS packet is then forward to the next node, and so.

Figure 8:
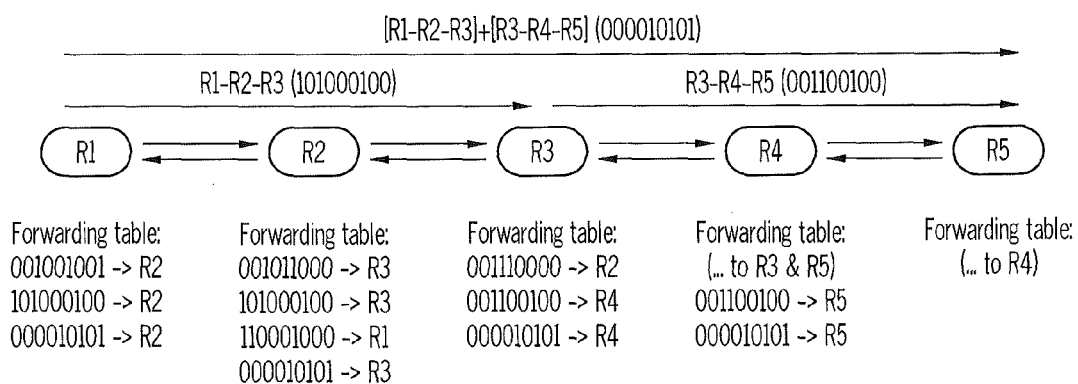
FIG. 8 illustrates another method of creating a virtual link through a network.

In FIG. 6 a virtual link is built using real links. It is also possible to define a new virtual links by combining existing virtual links. FIG. 8 shows how this is done. A virtual link R1-R2-R3-R4-R5 is defined such that one segment is the virtual link R1-R2-R3 and another segment is the virtual link R3-R4-R5. A virtual link may alternatively be defined such that at least one segment is an actual link and at least one segment is a virtual link.

A virtual link defined in this way is given a link ID that is different from (and need not be related to) the identifiers of its constituent segments, and from the identifiers of the actual links included in the virtual link. Thus, the virtual link R1-R2-R3-R4-R5 of FIG. 8 is given a link ID that need not be related to the link IDs of the two constituent Virtual links R1-R2-R3 and R3-R4-R5 nor to the link IDs of the underlying network links R1-R2, R2-R3, R3-R4, R4-R5.

The link ID of the virtual link R1-R2-R3-R4-R5 may be added to the forwarding tables of the nodes R1-R2-R3-R4 using a ViLS packet as described above. The operation is similar to that described for FIG. 6, with the link IDs included in the BF being the IDs of the virtual link R1-R2-R3 and the virtual link R3-R4-R5.

A virtual link may have an unlimited lifetime, or it may have a limited lifetime. As indicated in FIG. 7, the ViLS packet may contain also this lifetime information, if it is known. In such a case, nodes purge the virtual link from their forwarding table after its lifetime expires.

Modifications to the lifetime of existing virtual links can be done using a ViLS packet, by sending a new packet that defines a new lifetime. The same method can be used to manually purge existing virtual links, by sending ViLS where the lifetime is set to zero.

Multi-Path/Multicast Stateless Forwarding

The above description of the invention relates to a packet being sent from a source to a single destination node. The invention is not however limited to this, and may be used to deliver a packet from a source to two or more different destination nodes. This may be done by adding link IDs that define paths to two or more destinations to the Bloom filter to be included in the packet header.

Figure 9:
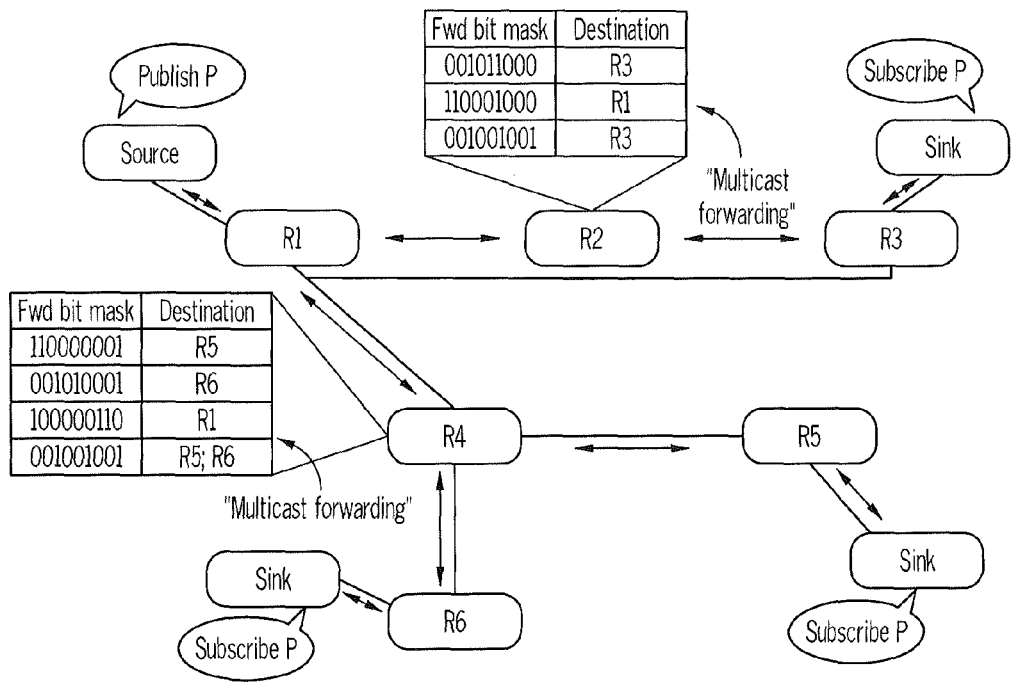
FIG. 9 illustrates virtual links that create Multicast trees.

Furthermore, although the above description of virtual links relates to a packet being sent from a source to a single destination node, creating multi-path or multicast virtual links is also possible. This may be done by adding to a BF two or more link IDs that both define links out from one node. This is shown in FIG. 9, where a virtual link including R1-R2-R3, R1-R4-R5 and R1-R4-R6 is defined (with link ID 001001001) The full multicast tree can be implemented by ORing Links R1-R2, R2-R3, R1-R4, R4-R5 and R4-R6 into the same BF.

The packet delivered from the source using this BF in the header will be delivered to all three sink nodes (R3, R5, R6) in the figure. In a same way that a virtual link between two nodes is setup in FIG. 6, FIG. 9 sets up a virtual multicast tree using exactly the same method. In this case each node that will send the data to more than one destination determines this in the forwarding table by associating a virtual link ID to multiple destination links (so that the forwarding table of node R4, as an example, lists both the link to node R5 and the link to node R6 against the link ID (001001001) of the virtual link).

The details of the virtual link may again be distributed using a ViLS packet. In FIG. 9, the routing function creates a virtual link ID (001001001) for the tree, generates a ViLS packet and injects it into R1. After the ViLS packet has passed to all destinations, a virtual multicast tree is setup in the network. When a data packet is sent with BF (001001001) containing only the virtual multicast tree's ID in its header, the data is routed from the Source to all Sinks in the network. FIG. 9 shows the forwarding tables for R2 and R4.

Figure 10:
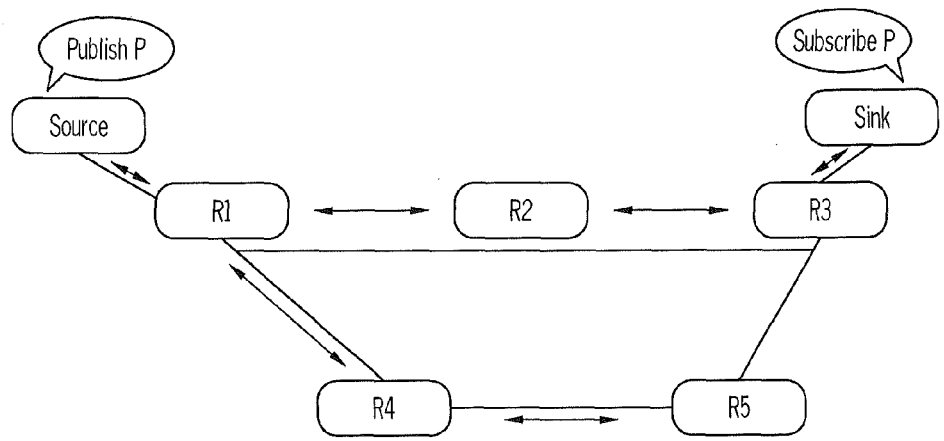
FIG. 10 illustrates multiple paths through a network for a single packet.

Another way to take advantage of multiple paths is to use it for redundancy. It is possible to create paths that have same source and final destination(s), but with multiple parallel paths (FIG. 10). While all paths are unidirectional, we can easily create such multi-path routes (or virtual links) between two nodes.

It should be noted that the generation of a virtual link is not limited to use with the specific routing method of the invention.

In the above embodiments the routes through a network are determined in the routing layer, using single links between nodes or virtual links built from single links between nodes. The invention is not however limited to this.

Stateful Routing

As a further alternative, it is possible to add nodes in the network that divide the network into more than a single stateless routing area. These proxy nodes maintain state information between different BFs and publications, and perform label switching between BF headers when packets are passing by. These proxy nodes can be used to avoid filling up Bloom filters or just to divide the network into different administrative domains.

Reduction of False Positive Rate

As mentioned above, one feature of a Bloom filter is that it may give a false positive (that is, advising that an item is present in the filter, while in fact it is not present) when checking for the presence of a link identifier in the BF. A false positive results in packets being forwarded over one or more links which were not included during the construction of the BF. Under the pub/sub paradigm this effect is not considered harmful as long as there is a way to control the false positive rate from becoming too large. The false positive rate depends on the number of items n inserted in the filter, the size of the filter m and the number of bits k that represent an item in the filter (where link identifiers take the form of an m-bit vector with k bits set to 1 and the remaining m-k bits set to 0).

A problem with BFs is that they get "full" relatively quickly. The probability of false positives increases as more elements are added to one filter. Thereby, for a certain BF size the number of links that can be represented by the BF is limited when it is desired not to exceed a certain false positive rate. As an example, with the current design of BFs and a typical packet header size of around 256 bits, the false positive rate (%) of the BF makes inserting more than 32 link IDs in the BF almost impractical, as this would give a high false positive rate (approx. 3%). However, in many cases 32 link IDs would be not enough for routing purposes (depending on network topology and the number of nodes communicating over the paths defined by the 32 links).

Furthermore, the current generation of BFs lacks a mechanism that allows finer control over the effects of false positives given a certain network topology and distribution of link IDs. In particular it would be useful for the Routing function in the envisioned system to have the flexibility of creating routing BFs that are equivalent in their main objective of defining a certain path in the network but that could avoid false positives over certain regions identified by link IDs where false positives are considered more harmful in any terms specified by the network operator.

Another issue with the proposed BF-based approach is security. Mechanisms are preferably required to deal with potential malicious source nodes that could generate by themselves a forwarding BF for potential Denial of Service attacks or bypass the intrinsic security of having a forwarding system based on naming links within a topology rather than host identities.

Accordingly, a further aspect of this invention addresses the issue of reducing the false positive rate of the BF-based routing approach and provides new mechanisms to control the effects of BFs along the routing paths. In this aspect of the invention a plurality of candidate Bloom filters (or other compact representations of sets, as this aspect also is not limited to Bloom Filters) are generated, and one of the candidate Bloom filters (or other compact representations of sets) is selected based on a pre-determined criterion such as, for example, which of the candidates has the lowest probability of returning a false positive etc. This aspect is based on the choice available during the probabilistic process of generating the BF containing the link identifiers.

This further aspect will, by way of example, be described with reference to routing in a network having a plurality of links, although it is not limited to this.

As explained above, each link of a network, such as the network of FIG. 4, has an associated link identifier (LID or Link ID). In the above embodiment, the LIDs are used to generate the Bloom filter, so that only one BF is generated for a particular network use. The further aspect of the invention, however, generates two or more candidate BFs that equally" represent the path(s) of a certain network. One way in which this may be done is to generate a plurality of link identifier tags (LITs) associated with each link identifier (LID) and generate a plurality of candidate Bloom filters from the LITs. At the time of selecting the BF used for source routing, an optimal set of LITs to be inserted in the BF is selected so that the probability of false positives can be minimized.

In general terms, when this aspect of the invention is applied to a set of identifiers, a plurality of representations (or "tags") is generated for each identifier. A plurality of candidate Bloom Filters (or a plurality of other compact representations of set membership) are generated from the plurality of representations of the identifiers, and one of the Bloom Filters (or other compact representation of set membership) is selected from the candidates.

In one embodiment, for each LID we compute d compact representations of the LID, where d is an integer greater than 1. Each compact representation is known as a link identifier tag (LIT). For each LIT of the links to be inserted in the BF, a candidate BF is generated by ORing one LIT representation at a time of each LID. This results in d candidate BFs that "equally" represent the link identifiers of the network path(s), where "equally" means that each of the d candidate BFs will cause a packet to follow (at a minimum) all the paths along which it was intended to be routed.

In principle it is not necessary to generate d LITs for each Link ID. As an example, if there are 32 links it would be possible to generate d LITs for 31 of the 32 Link IDs, but generate just one LIT for the 32nd link so that this link has the same LIT in each of its d representations. In this example the 32nd LIT would not contribute to decreasing the number of ones in the BF, since there would be no power of choice over how many bits the 32nd LIT sets to one when constructing the candidate BFs.

Generating d LITs for only some of the Link Ids could be of use in a system where some of the forwarding nodes interpreting the BF would not have this d enhancement, so would not have different forwarding tables for the LITs. It makes it possible to accommodate simpler forwarding nodes, and provides backwards compatibility support.

Of the d candidate BFs, one is chosen to be inserted in the packet header to provide routing information, as in the embodiments described above.

The primary criterion for choosing the BF to be used can be determined by the user and, for example, may be minimizing the false positive rate—in which case the BF with the largest amount of zeros is selected from the candidate BFs. Other criteria to select the BF can be applied, for instance minimizing the false positive rate for a subset of one or more of the links (or, in general terms, minimizing the false positive rate for a subset of one or more of the identifiers)—this may be of use in for example avoiding certain link identifiers causing false positives that result in packets being forwarded to a certain network region (i.e., to provide the ability to confine false positives in certain network areas).

When this aspect is applied to the embodiments described above the packet header now includes, in addition to the BF containing the forwarding information, the binary representation of the index d that identifies the set of LITs that were used to construct the BF. The routing nodes receiving the BF of this aspect (referred to as a "d-enhanced BF") can select the forwarding table appropriate for the set of LITs that were used to construct the BF.

The proposed d-enhanced BF approach enables thereby finer control over the effects of false positives that could be applied to enforce routing policies, and can be augmented to provide security features when using BFs as forwarding headers.

Detailed Description of Enhanced Bloom Filters

Embodiments will be described with reference to a Pub/Sub network with three operational layers: Rendezvous, Routing, and Forwarding. Together they provide the functionality required for locating and delivering data between the source and destination nodes. Each link of the network has an associated identifier (Link ID). In this aspect of the invention d (d>1) representations of each Link ID are generated, and d candidate BFs are generated from the d representations of the link IDs. Having a set of d representations associated with a link identifier enables more efficient and powerful forwarding schemes by providing finer control over false positives. Furthermore, the power of choice of the LIT-based BFs enables the enforcement of policies for security or inter-zone routing purposes by considering these policies as BF selection and optimization criteria.

Building Link ID Tags

Link IDs are generated as directed identifier for links of a network. (It will be assumed for simplicity of description that all "links" are actual links between two network nodes, but a link ID may also be the identifier of a "virtual link" as described with reference to FIG. 6.) In this aspect of the invention, a Link ID (LID) can take any name form to identify a link between two network elements (e.g., routers). Typically, a LID will be a randomly generated bit combination (e.g., 256-bit hash value).

The further aspect of the invention introduces the concept of a "Link ID Tag" (LIT), as a compact representation of a Link ID. Moreover, every link ID is associated with a set of d LITs that are computed by applying a multi-valued mapping function to each LID, so that the LITs are computed in the same way for each link ID. d is a system parameter that can be optimized depending on the network. A typical range of d would be from 2 to 32. (The case of only a single LIT can be seen as the former Link ID, which would correspond to the case of d=1.) For instance, the mapping function can be a set of k hash functions that are applied to each Link ID to create, for each Link ID, a LIT bit vector with k bits set to 1 and m-k bits set to 0. Incorporating a LIT of this form into a BF would be equivalent to a m-bit BF with one inserted element using k hash functions. (A description of how the d sets of LITs are obtained is given below.)

In the previous embodiments, a Link ID may the form of a bit mask of size m with k bits set to 1 and the other m-k bits set to 0, for convenient BF addition and checking operations. However, in this embodiment it is the LITs that take the form of a bit mask of size m with k bits set to 1 and the other m-k bits set to 0, and the size and representation of the Link ID is free and can take any suitable form from which the LITs can be computed—thus, this aspect allows greater choice of form for the Link IDs themselves. The key difference is that now we have a set of d LITs that represent equivalently the same network link, and we can take advantage of the randomness of LIT and BF generation to select the set of LITs, representing the combination of link identifiers, that minimises the false positive rate.

Moreover, the generation process of the set of d LITs for a link ID can be a random process or a more controlled process to adapt better to the actual topology of the network. The generation of the LITs for a Link ID may be linked to topology as follows: During the bootstrap process (e.g., a forwarding node attaching to the network), the link IDs are registered with the Topology Module. The LITs can be generated by the forwarding node itself if the hash functions used for the generation of LITs are known by both parties. Alternatively the Topology Module can return the LITs to the attaching node. At this point, the Topology Module has the power to check the list of LITs to be "installed" in the forwarding tables of the attaching node against active LITs and commonly utilized network paths or delivery trees so that the generated LITs have minimal collisions and thereby reduced false positive rates.

FIG. 14 illustrates one possible method of generating LITs for one Link ID, by applying a first hash procedure $H1(x)$ to the Link ID to generate the first LIT based on the k bits determined by $H1(x)$ to be set to one, by applying a second hash procedure to the Link ID to generate the second LIT and so on until a $d^{th}$ hash function Hd(x) is applied to the Link ID to generate the $d^{th}$ LIT. Each hash procedure consists of k hash functions, each of which determines one bit position in the bit vector that is to be set to one, as described with reference to FIG. 1 above.

Applying each hash procedure to the Link ID requires that each hash procedure contains new sets of hash functions, so that no two hash procedures should generate the same output (except by chance). Alternatively, the subsequent hash procedures could be applied iteratively to the previous generated LIT and this would not require that each hash procedure contains new sets of hash functions. Alternatively, the set of k hash functions may remain fixed and be applied iteratively on the last generated LIT—this would be another valid procedure to return good random LITs and save on the amount of hash functions required. As a further alternative, described below, only two random functions and two hashing are required to generate all the LITs.

Similarly as for the process of link ID generation, there are various ways to determine the link ID Tags. They may be automatically generated by the routers and communicated afterwards to the routing layer, or they may be assigned by other instances and configured on the routers.

A router can assign a link ID for its own outgoing links towards routers that it know it is connected directly (see LinkID x output interfaces in FIG. 15). FIG. 15 is a schematic view of a network node that identifies each output interface with a Link ID (Link IDa for output port 1, Link IDb for output port 2, and so on). The node maintains d forwarding tables indexed by Link ID Tags, which identify the output port(s) associated with each LIT. (As already noted, a Link ID may relate to a virtual link as well as links to the cache system or other network processors/system processes.) The information maintained in the Routing function is now extended to include the set of d LITs associated with each Link ID (although in principle only the Link IDs could be stored at and the candidate LITs could be consistently generated on-demand).

As with the standard Link ID approach, the forwarding state to be maintained in a network node continues to be very small. For performance reasons it might be desired maintain a forwarding table for each of the d representations of link identifiers (as shown in FIG. 15), although if the d value is contained in the incoming packet the LIT for each link ID could be computed on-demand from knowledge of how the LITs were originally generated. FIG. 16 is a schematic illustration of a packet header having a field that gives the value of d used to generate the Bloom filter that is contained in another field in the packet header.

If one considers the number of different hash functions required to calculate the d Link ID Tags from a Link ID, to achieve the maximal entropy in the bit distribution of each LIT would require k different hash functions per LIT. That suggests that in total k*d hash functions would be required to compute the d LITs for a LID. It is worth noting two aspects when using the hash functions in this invention. First, that given the randomness of the BF generation and selection process proposed in this invention, it is not critical that the hashes used to generate the LITs are truly random. Second, using the double hashing technique the d LITs can be very efficiently generated by using only two random independent hash functions (e.g., BOB, OAAT, SBOX, Hsieh, TWMX, RS, SHA, MD5) without any increase in the asymptotic false positive probability. Two hash functions h1(x) and h2(x) can simulate i hash functions of the form:

$$g_i(x) = h1(x) + i * h2(x) \bmod m$$

Furthermore, using this method, any LIT generation process can be compactly represented by the set of i indexes that were used to compute the k positions of the LIT set to 1. Therefore, if h1(x) and h2(x) are known by the routing elements, only sharing d*k integers i is required to derive the LITs for any LID. The Topology Module could, instead of sending back the whole LITs to the forwarding nodes, just send the indexes i to be used to compute the LITs. For instance LIT1 [i=1,2,3,4,5] would mean that LIT1 is computed by setting to one the k(=5) bits determined by g(x) using the i values [1,2,3,4,5] and h1(x) and h2(x). Since h1(x) and h2(x) are known by both the forwarding node and the Topology Module, just sharing the LID and the indexes i (in total there are d*k indices) is enough to enable the d LITs to be computed. Moreover, as already mentioned, i could be just an incremental sequence and in this case can be also assumed to be known and therefore need not be exchanged.

Link ID Tags Forwarding Table

When a packet arrives at a network node, the packet header contains a BF that contains or encodes the LITs of the link(s) along which the packet should be forwarded, and also identifies the d value of the BF. As noted above packet forwarding may be done by the network node maintain a forwarding table for each of the d representations of link identifiers, as shown in FIG. 15. Upon arrival of a packet over an incoming link, the forwarding function in the node selects the forwarding table to be used based on the value d included in the d-enhanced BF forwarding header. The port forwarding operation is straightforward, the BF is AND in parallel against all LIT entries and whenever the LIT entry is obtained as a result of this fast element check operation the packet is forwarded to the PortOut value in the forwarding table.

A number of space efficient alternatives for storing the LIT entries in the forwarding tables will be described.

Standard Representation

In the standard representation a separate look-up table is stored for each possible value of d, requiring d look-up tables to be stored. Each look-up table lists the appropriate output port for each Link ID Tag, for example as follows (tables are shown only for two d values):

| Link ID Tag (d = 00) | Output Interface |
|---|---|
| 0010100000100001 | 1 |
| 0001000010010100 | 3 |
| 256 bits | 1 Byte |
| Link ID Tag (d = 10) | Link ID Tag (d = 10) |
| 1000010000100101 | 7 |
| 1000000010010100 | 1 |
| 256 bits | 1 Byte |

Total memory in bits for the LIT based forwarding table is now:

$$FT_{mem} = d * \#LIDs * (\text{size}(LIT) + \text{size}(\text{PortOut}))$$

EXAMPLE

If d=8, there are 512 Link IDs, each LIT has a size of 256 bits and each output port name has a size of 1 bit, then:

$$FT_{mem} = 8 * 512 * (256+8) = 1081344 \text{ bits} = 1056 \text{ kbits} \approx 1 \text{ Mbit}$$

(Later, we show through simulation results condensed in FIGS. 18 and 19, that d=8 is a good parameter choice give the small size of the forwarding BF.)

Sparse Representation

This is a space efficient representation of a LIT where only the positions of the k bits set to 1 are stored as the LIT entry. The representation contains d look-up tables as for the case of the standard representation, except that the look-up tables do not store the full LITs but store only the positions of the k bits of the LIT that are set to 1. The size of the LIT in bits can be reduced to k times the bit position binary representation (factor $\log(x)_2$/×reduction). In this case, the LIT size is given by:

$$\text{size}(LIT)=k^*\log_2(LIT)$$

Example: if k=5, size(LIT)=5* $\log_2(256)$=5*8=40 bits
The total memory for the d LIT forwarding tables is now:

$$FT_{mem}=8^*512^*(40+8)=196608=192\,kbit$$

Partitioned Hash Sparse Representation

The partitioned hash sparse representation uses the same principle of BF sparse representation by coding only the bit positions of the k bits of the LIT that are set to 1. However, it assumes that the BF is generated using partitioned hashing, where the hash operations (setting bits to 1) are performed exclusively over a segment of the m-size bit vector representing the BF. Only one of each k bits is set over a segment of size m/k. This technique has been proven to have no significant effects on the false positive rates. In this case, the LIT size is given by:

$$\text{size}(LIT)=k^*\log_2(LIT/k)$$

Example: if k=5, size(LIT)=5* $\log_2(256/5)$=5*6=30 bits
Total memory for the d LIT forwarding tables is now:

$$FT_{mem}=8^*512^*(30+8)=196608=144\,kbit$$

Construction of d-optimized Bloom Filters for Efficient Routing

This section details how the procedure of constructing optimized BFs is performed. With the Link ID Tags we have the base of identifiers that enables a more flexible construction of forwarding BFs by exploiting the power of choice between the d LITs representing a network link.

It is assumed that the Topology module or Routing function have solved the problem of selecting the set of link IDs required for establishing the network paths between the communicating nodes (steps 3 and 4 of FIG. 12). Let n be the number of link IDs to be represented in the BF. The optimization procedure for the sake of minimizing false positives is as follows. As described above, d LITs are generated for each Link ID, and these are labelled LIT1, LIT2 . . . LITd (steps 1(1), 1(2), . . . 1(d) of FIG. 20).

The Routing function constructing the BF inserts the LIT1 representation of every link ID in a first candidate Bloom filter BF1 by simple ORing the LIT1s (step 2(1) of FIG. 20). Similarly, following the same method it inserts the LIT2 representation of every link ID in a second candidate Bloom filter BF2 by simple ORing the LIT2s (step 2(2) of FIG. 20), and so on, taking the next LIT representation of every link to be inserted until the $d^{th}$ candidate Bloom filter BFd is constructed by inserting the LITd representation of every link ID (step 2(d) of FIG. 2), resulting in d BFs that represent the same network path(s). (In practice the d BFs are constructed in parallel, rather than one after the other as described here.) However, although the d BFs represent the same network path(s), owing to the probabilistic nature of the LITs and the OR operation to construct the BF, the BFs will vary regarding the number (and positions) of bits set to 1.

The BF to be used in routing packets is selected from the d candidate BFs (step 3 of FIG. 20). In one embodiment, the BF that has the lowest overall probability of returning a false positive is selected.

The selected Bloom filter may then be used as described in the embodiments above and, for example, may be sent to the source node and assembled into the packet header (steps 6, 7 of FIG. 12). Alternatively the routing function may send the selected Bloom filter to a node other than the source node.

Although the method of FIG. 20 is described above as being performed in the routing function, it could alternatively be performed in the source node.

In general, where the method of FIG. 20 is used to generate the BF for use in the method of FIG. 12, three principal stages may be identified: generating the d candidate BFs; selecting one of the candidate BFs for use; and using the selected BF.

These stages may all be performed in the same network node, or they may be spread over two or even three different network nodes or end-host nodes. As an example, if the method of FIG. 20 were performed wholly in the source node, as suggested above, with the source node then including the selected Bloom filter in a packet header, this would be a case of the generating stage, the selecting stage and the use stage all being carried out in the same node.

As another example the method of FIG. 20 could be split between the routing function and another node (for example the source node). For example the routing function could generate the d Bloom filters, but then could send all d Bloom filters to another node with the selection of the Bloom filter to be used being made in the another node. If desired in this embodiment, the routing function could indicate which Bloom filter it considers should be selected when it sends the d Bloom filters to the other node, but the other node would be able to over-ride this indication. If the other node is the source node, the source node may then include the selected Bloom filter in a packet to be sent from the source node. (This would correspond to the routing function carrying out the generating stage, and the source node carrying out the selecting stage and the use stage.) If the other node is not the intended user of the selected Bloom Filter, however, the other node would send the selected Bloom filter to the intended user, for example to the source node. (This would be a case of the generating stage, the selecting stage and the use stage all being carried out in different nodes.)

As a further example, the routing function could make a preliminary selection from the d Bloom filters, for example discarding from further consideration any Bloom filter that would give false positives for one or more specified links. The routing function would then send those Bloom filters that survived this preliminary selection to the another node (possibly with an indication of which Bloom filter the routing function considers should be selected) for the another node to make the final selection. If the other node were not the intended user of the selected Bloom Filter, the other node would send the selected Bloom filter to the intended user.

The probability of a BF returning a false positive depends on the ratio of 0's to 1's in the BF will be key—it can be shown that the false positive ratio of a BF is a function of the probability that a cell is empty (for example, see A. Broder and M. Mitzenmacher, "Network applications of Bloom filters: A survey," Internet Mathematics, vol. 1, no. 4, 2002):

$$p=Pr[\text{one cell is empty}]=(1-1/m)^{kn}\sim e^{-kn/m}$$

$$fpb=Pr[\text{false positives}]=(1-p)^k\sim(1-e^{-kn/m})^k$$

The probability of a cell being empty depends on the number of cells that have already been set to 1. If the number of bits set to 0 is increased there is more chance of finding a 0 when checking for elements, and consequently the false positive ratio is less. The formula given by fpb is the false positive probability before hashing. Once the hashing procedure has been done and the bits have been set to one in the BF the fill factor p (rho) is known and a better estimator for the false probability after hashing is given by:

$$fpa = Pr[\text{false positives}] = \rho^k$$

Thus, selection of the BF that has the lowest probability of returning a false positive from the d candidate BFs is straightforward—the BF with the most 0's (or smallest number of bits set to 1) will perform better, causing fewer false positives, which in the routing method of the invention results in fewer less links receiving unrequested traffic. The selection algorithm to select the candidate d BF with lowest predicted false positive probability would be:

$$\text{Select } d \text{ yielding the } \min\{\rho_0^k, \ldots, \rho_d^k\} fpa.$$

Note that k is not required to be the same for each d LIT representation. Moreover, depending on the application scenario, it can be useful to have different amount k of bits set to one for each LIT representation. For instance, with d=8, we could have a distribution of k like, for example, {3;3;4;4;5;5;6;6}. That means, two out of the 8 LITs would have only 3 bits set to 1, two LITs would have 4 bits set to one, and so on. In this case the selection algorithm is the described above which is the general case, and not just the minimum number of zeros which only applies when the same k is used for the constructions of all LITs.

FIG. 17 shows the optimization process for a simplified case of generating d=4 candidate BFs to represent a path consisting of link A and link B. In this example BF2 is the optimal BF to be used as the routing BF in the packet header since it contains the maximum number of 0's and so has the lowest overall probability of giving a false positive.

Another interpretation of this optimization would be that, for a certain maximum desired false positive rate, with the d-choice LIT optimization it is now possible to insert more link identifiers into the BF and thereby construct larger delivery trees that could span over further hops and reach more destination hosts.

The optimization of the BF does not need to be limited to the overall false positive rate, but could consider other policies or network optimization policies. For instance, after generating the d candidate BFs, the Routing optimization module could check whether certain link ID Tags of the forwarding elements are going to cause undesired false positives for a particular subset of links, e.g., forwarding towards a non peered domain, a slow network path or a congested region. In this case, it could choose to discard this BF alternative even though it could have the best false positive ratio in absolute terms.

An example of this is given in Table 1.

Table 1 shows, for each candidate BF, not only the overall false positive ratio but the false positive ratio for three subsets of particular links (inter-domain links, links in low capacity zones and congested links). It is assumed that a false positive in an inter-domain link, a link in a low capacity zone or in a congested link is more harmful than a false positive in other links. Although candidate BF3 has a low overall false positive ratio it gives a high probability of false positive for links in low capacity zones and congested links. It may therefore be desirable to select candidate BF2 as the BF for the packet header—although candidate BF2 has a higher overall false positive ratio than candidate BF3 it gives a lower probability of false positive for links in low capacity zones and congested links. Thus, this embodiment allows the BF to be selected on the basis of the probability of a false positive in selected links (in this embodiments for links where a false positive is considered to be is more harmful) rather than on the basis of the overall probability of a false positive.

It can therefore be seen that this aspect of the invention provides a powerful method of constructing the forwarding BF for packet headers so as to avoid (or minimise) packets erroneously entering certain network areas owing to the BF returning false positives. Generating d equivalent candidate BFs and selecting one of the candidate BFs guarantees that the essential path(s) of packets through the network is/are maintained, but can minimize false positives over certain links or spread the effects of false positives throughout more convenient paths.

Advantages of the Invention

The usage of the proposed link ID Tags reduces the false positive rate when a given set of link information is inserted into a probabilistic compact representation such as a Bloom filter. Reduction of false positives results in a more bandwidth efficient solution of the BF-based routing approach. The proposed methods of generating LITs and selecting the most appropriate BF significantly enhances the performance of the BF-based routing scheme without losing the simplicity of the forwarding process and at a very small implementation cost. Consequently, for a certain maximal false probability value, the proposed construction of BFs based on link ID Tags increases the capacity of link information that can be added to a BF without extending its size.

Smart choosing among candidate Link ID Tags representing link IDs not only increases the maximum number of routing hops determined by the BF but also provides more flexibility in controlling the effects of false positives by e.g., preventing (or minimising) false positives in certain network regions identified by LIDs or by e.g., spreading the effects of false positives throughout more convenient paths. This finer

TABLE 1

SELECTION CRITERIA - OPTIMIZATION GOAL

| | | Check for false positives in the BFs for these sets of Link ID Tags | | |
|---|---|---|---|---|
| Candidate LIT BFs | Overall lowest false positive rat. | Inter-domain Link IDs subject to policies | Link IDs in dense/ low capacity zones | Congested Link IDs (dynamic set) ... |
| BF1 | ++ | − | + | ++ |
| BF2 | +++ | −−− | − | − |
| BF3 | − | + | +++ | +++ |
| ... | | | | |
| BFd | + | + | − | + | control over false positives potentially enables applying routing and security policies to the BF-based source routing approach described herein.

FIG. 18 shows the improvement in actual false positive rates of BFs constructed following the d-choice LIT technique. FIG. 18 shows the false positive rate as a function of the number of links encoded in a BF for five cases:

1) Link IDs encoded into BF, k=5 (shown as +)
2) LITs encoded into BF, for k=4, d=2 (shown as x)
3) LITs encoded into BF, for k=5, d=4 (shown as *)
4) LITs encoded into BF, for k=6, d=8 (shown as open squares)
5) LITs encoded into BF, for k=6, d=16 (shown as closed squares)

The figure shows the average and spread of the false positive rates over 50 experiments per data point (number of elements in the filter).

IT can be seen that encoding LITs into the BF significantly reduces the false positive rate, with the reduction becoming greater as the number of links in the BF increases. For a BF size to 244 bits, a standard BF in which the Link IDs are encoded presents a false positive rate of 4% when containing around 35 link IDs. For a d=8 LIT BF a similar false positive rate is only observed when 60 link IDs are inserted into the BF. The d-choice BFs outperform standard BFs constructs for every setting.

FIG. 19 shows how the improvement in actual false positive rates of BFs constructed following the d-choice LIT technique depends on the value of d. FIG. 19 shows the false positive rate as a function of the number of links encoded in a BF for three different values of d as k is kept constant:

1) LITs encoded into BF, for k=5, d=4 (shown as +)
2) LITs encoded into BF, for k=5, d=8 (shown as x)
3) LITs encoded into BF, for k=5, d=16 (shown as *)

The figure shows the average and spread of the false positive rates over 50 experiments per data point (number of elements in the filter).

From FIG. 19 we can deduce that setting the parameter d=8 appears to be a good trade-off between on the one hand reduction in the false positive rate and on the other hand the costs associated with having larger d values in the system (such as the forwarding table size and the number of bits ($\log_2(d)$ bits) in the BF header).

In the above method, the method of associating d 'equivalent' Tags to a unique ID have focused on usage scenarios where the ID refers to some identifier for a network link.

However, the hashing procedure used to generate the Tags from the ID is agnostic to the name form, size or semantics of the ID from which the d-Tags are derived. Therefore, the above-described methods of constructing d candidate BFs are not limited to BFs that encode network links but apply to other use cases where a set of IDs (identifiers) is compactly represented by a probabilistic data structure such as a BF.

One example would be when we consider as ID a host name (or any type of host identity, identifier, signature, key, etc) and we want to build a compact representation of a set of host names. Then we can similarly define d Tags for each of the IDs, compute the d candidate representations (Bloom filters) and apply the selection algorithm appropriate to the particular usage scenario. Again, the basic criteria could be minimizing the false positive probability estimation of the BF, and therefore the selection algorithm would choose the candidate with the lowest number of bits set to one, the best false positive probability after hashing which will depend on how many items where inserted and, on how the Tags were constructed (for example depending on whether every Tag has a fixed number k of bits set to 1 or whether Tags have different cardinality of k). In scenarios where the BF contains few elements a larger k would yield better false positive estimators after hashing. On the other hand, when the BF is more filled, setting fewer bits (k) per element will yield better false positive ratios. Having this flexibility in the k value natively adapts the selection algorithm for more usage scenarios.

Similarly, more elaborate selection strategies can be followed to fulfil the optimization objectives in each case; e.g., test sets of host IDs can be also constructed and tested for false positives against the candidate BFs and the candidate BF with the lowest observed false positives ratios could be selected. Other offline selection criteria could include test sets for which a single false positive would directly exclude the candidate BF from the selection process—for example one could specify that BFs should never cause false positive for certain Link IDs, for instance for heavily used virtual Link IDs spanning over a network region or over inter-domains links.

The key benefits of having the d-Tags do also apply, and include enabling the enforcement of policies, yielding better performance, enabling new security mechanisms and so on.

Further envisioned IDs from which Tags can be constructed include network domains (administrative and physical domains), networking systems, application processes, network interfaces, logical and virtual ports, and so on. Complex optimization strategies and specific selection criteria may be defined depending on the application, while the basic construction methods of the d Tags and d candidate BFs could be directly applied as well as or instead of a simple false positive ratio mitigation algorithm.

The invention claimed is:

1. A method of providing packet routing information, the method comprising:
    encoding routing information from a source node to one or more destination nodes into a compact representation of set membership;
        wherein the routing information comprises representations of one or more identifiers, each identifier identifying a respective network link, a respective node, or a full or partial path containing two or more network links; and
        wherein the method comprises generating d candidate compact representations of set membership from d representations of the one or more identifiers, where d is an integer greater than one, and putting one of the candidate compact representations of set membership into a header of a packet that is to be sent from the source node to the destination node(s).

2. The method as claimed in claim 1 wherein the routing information is encoded at the source node or at a routing server.

3. The method as claimed in claim 1 and further comprising:
    including, in the packet header, information identifying the compact representation of set membership included in the packet header.

4. A method of routing a packet through a network, the method comprising:
    receiving the packet at a network node;
    interrogating routing information contained in a header of the packet as a compact representation of set membership to determine one or more links along which the packet is to be sent from the network node and/or to determine one or more other nodes to which the packet is to be sent from the network node; and
    forwarding the packet along the determined link(s) and/or to the determined other node(s);

wherein the routing information comprises one of a plurality of candidate representations of one or more identifiers, each identifier identifying a respective network link, a respective node, or a full or partial path containing two or more network links; and wherein the routing further comprises selecting, from d look-up tables each corresponding to one of d candidate representations of the one or more identifiers, where d is an integer greater than one, a look-up table corresponding to the received representation of the one or more identifiers.

5. A network node for providing routing information for packets, the network node being adapted to encode the routing information from a source node to one or more destination nodes into a compact representation of set membership for inclusion into a header of a packet that is to be sent from the source node to the destination node(s), the routing information comprising representations of one or more identifiers;

wherein the network node is adapted to encode the routing information by:

generating d representations of at least some of the one or more identifiers, where d is an integer greater than one;

generating d candidate compact representations of set membership from the d representations of the one or more identifiers; and selecting one of the candidate compact representation of set membership.

6. The network node as claimed in claim 5 and adapted to encode routing information comprising representations of one or more identifiers by:

generating d representations of at least some of the identifiers, where d is an integer greater than one;

generating d candidate compact representations of set membership from the d representations of the identifiers; and sending two or more of the candidate compact representations of set membership to another node.

7. The method as claimed in claim 1 wherein each of the d candidate compact representations of set membership from d representations includes two or more of the one or more identifiers forming a complete path from the source node to the one or more destination nodes.

8. The method as claimed in claim 1 wherein generating the d candidate compact representations of set membership from d representations includes generating each d candidate compact representation of set membership such that all representations of the one or more identifiers that form a complete path of the respective candidate compact representation of set membership from the source node to the one or more destination nodes can be matched with a portion of the candidate compact representation of set membership.

9. The method as claimed in claim 8 wherein generating d candidate compact representations of set membership from d representations further includes logically combining a representation of a respective candidate compact representation of set membership with each representation of the one or more identifiers that form the complete path of the respective candidate compact representation of set membership to form the respective candidate compact representation as a composite of the representations of the one or more identifiers that form the complete path.

10. The method as claimed in claim 9 wherein logically combining includes performing a logical OR on the representation of the respective candidate compact representation of set membership and each representation of the one or more identifiers that form the complete path of the respective candidate compact representation of set membership.

11. The method as claimed in claim 1 wherein each of the d candidate compact representations of set membership indicates a match to a selected identifier by logically filtering the respective candidate compact representation of set membership with the representation of the selected identifier.

12. The method as claimed in claim 11 wherein logically filtering includes performing a logical AND on the respective candidate compact representation of set membership and the representation of the selected identifier.

13. The method as claimed in claim 1 wherein the one of the d candidate compact representations of set membership comprises a bloom filter.

14. The method as claimed in claim 1 further comprising: optimizing d to reduce false positives.

15. The method as claimed in claim 1 wherein each of the one or more identifiers of a respective d candidate compact representation of set membership has d representations.

16. The method as claimed in claim 4 wherein interrogating routing information includes logically filtering a respective candidate compact representation of set membership with the received representation.

17. The method as claimed in claim 16 wherein logically filtering includes performing a logical AND on the respective candidate compact representation of set membership and the received representation to indicate if the received representation is a match of at least a portion of the respective candidate compact representation.

* * * * *

UNITED STATES PATENT AND TRADEMARK OFFICE
CERTIFICATE OF CORRECTION

PATENT NO. : 8,559,434 B2  
APPLICATION NO. : 13/059958  
DATED : October 15, 2013  
INVENTOR(S) : Esteve Rothenberg et al.

It is certified that error appears in the above-identified patent and that said Letters Patent is hereby corrected as shown below:

In the Specification

In Column 5, Line 67, delete "too" and insert -- to --, therefor.

In Column 8, Line 59, delete "$4^{th}$ $6^{th}$" and insert -- $4^{th}$, $6^{th}$ --, therefor.

In Column 9, Line 3, delete "as a" and insert -- as an --, therefor.

In Column 10, Lines 39-48, delete "Routing function......R1-R2-R3." and insert the same at Line 38, after "When the" as a continuation paragraph.

In Column 10, Lines 52-54, delete "R2 to R3.........Fig. 11." and insert the same at Line 51, after "link" as a continuation paragraph.

In Column 13, Line 9, delete "more that" and insert -- more than --, therefor.

In Column 19, Line 26, delete "LinkID x" and insert -- Link ID x --, therefor.

In Column 22, Line 59,
delete "$p=Pr[\text{one cell is empty}]=(1-1/m)^{kn} \sim e^{-kn/m}$" and
insert -- $p = Pr[\text{one cell is empty}] = (1 - 1/m)^{kn} \approx e^{-kn/m}$ --, therefor.

In Column 22, Line 61,
delete "$fpb=Pr[\text{false positives}]=(1-p)^{k} \sim (1-e^{-kn/m})^{k}$" and
insert -- $fpb = Pr[\text{false positives}] = (1-p)^{k} \approx (1- e^{-kn/m})^{k}$ --, therefor.

In Column 25, Line 65, delete "where" and insert -- were --, therefor.

Signed and Sealed this  
Twenty-second Day of July, 2014

Michelle K. Lee  
*Deputy Director of the United States Patent and Trademark Office*